US009602350B2

(12) United States Patent
Virk et al.

(10) Patent No.: US 9,602,350 B2
(45) Date of Patent: Mar. 21, 2017

(54) EXPANDABLE DISTRIBUTED CORE ARCHITECTURES HAVING RESERVED INTERCONNECT BANDWIDTHS

(71) Applicant: DELL PRODUCTS L.P., Round Rock, TX (US)

(72) Inventors: Jaiwant Virk, San Jose, CA (US); Annie A. Dang, Danville, CA (US); Kwangsuk Kim, San Jose, CA (US); Alexis Dacquay, Staines (GB)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/259,515

(22) Filed: Sep. 8, 2016

(65) Prior Publication Data

US 2016/0380822 A1    Dec. 29, 2016

Related U.S. Application Data

(63) Continuation of application No. 13/778,056, filed on Feb. 26, 2013, now Pat. No. 9,473,358.

(51) Int. Cl.
*H04L 12/24* (2006.01)
*H04L 29/08* (2006.01)
*H04L 12/931* (2013.01)

(52) U.S. Cl.
CPC ........ *H04L 41/0836* (2013.01); *H04L 41/145* (2013.01); *H04L 49/45* (2013.01); *H04L 67/1097* (2013.01)

(58) Field of Classification Search
CPC ... H04L 41/0803; H04L 41/22; H04L 41/145; H04L 49/00; H04Q 11/0005
See application file for complete search history.

(56) References Cited

U.S. PATENT DOCUMENTS

| 7,440,448 B1 | 10/2008 | Lu et al. |
|---|---|---|
| 7,983,194 B1 | 7/2011 | Genetti et al. |
| 2002/0156888 A1 | 10/2002 | Lee |
| 2010/0061394 A1 | 3/2010 | Sindhu |
| 2010/0165983 A1 | 7/2010 | Aybay |
| 2013/0051235 A1 | 2/2013 | Song et al. |

*Primary Examiner* — Ian N Moore
*Assistant Examiner* — Brian T Le
(74) *Attorney, Agent, or Firm* — Haynes and Boone, LLP

(57) ABSTRACT

A network system for an expandable distributed core architecture ("DCA") includes multiple spine switches, multiple leaf switches coupled thereto, and a plurality of interconnections coupling each of the spine switches to each of the leaf switches. Servers, storage, and other system items and resources can be coupled to the leafs via downlinks and uplinks. Each of the plurality of spine switches includes at least one unused spine port that is reserved for a future expansion of the DCA in order to accommodate the addition of at least one other separate leaf switch to the at least one unused spine port. Additional ports can be unused and reserved for future expansion additions of more leafs and/or more spines. Also, a computing system assists in the design of the specific number and configuration of spines, leafs and interconnections based upon user inputs regarding current and future system needs.

20 Claims, 5 Drawing Sheets

EXPANDABLE DISTRIBUTED CORE ARCHITECTURES HAVING RESERVED INTERCONNECT BANDWIDTHS

CROSS REFERENCE TO RELATED APPLICATIONS

The present application is a continuation of U.S. patent application Ser. No. 13/778,056, filed 26 Feb. 2013, incorporated herein by reference.

TECHNICAL FIELD

The present invention relates generally to data communication networks, and more particularly to data communication network architectures that involve the use of distributed cores.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information, and may include one or more computer systems, data storage systems, and networking systems.

As the demands for throughput in computing systems, networks and data centers increase, there have been a number of advancements in the way that such systems are designed and built. While traditional data center architectures typically use a monolithic, chassis-based core with a two layer or three layer design, the use of a distributed core has become more prevalent of late. A distributed core architecture ("DCA") can reduce the burdensome hierarchy that exists with traditional data center switching elements, and in turn provide greater scalability, higher bandwidth, and higher resiliency non-blocking communications for computing and storage nodes.

One problem with using distributed cores, however, is that a distributed core architecture is often determined in a customized fashion for an immediate specific application, with an appropriate number of spine switches, leaf switches, connections and other system components then being provided and constructed to suit that specific application. When it then later becomes desirable to expand the number of ports, throughput or some other relevant feature for that specific distributed core architecture, however, then another substantial customized determination is made. This added customized determination can take into account the existing system components and configuration, as well as what added features are needed, upon which additional spines, leafs, connections, ports and the like are added and rerouted to arrive at the new architecture. This process is typically customized for each given application and expansion, and as such can involve a significant amount of effort in recalculation and reconfiguration. Further, the possible need for even one or two additional spines and/or leafs or a quick reconfiguration that adds unnecessary spines and/or leafs can result in significant inconveniences or added costs.

Although many systems and methods for providing distributed core architectures for use in data centers and networks have generally worked well in the past, there is always a desire for improvement. In particular, what is desired are systems and methods that provide distributed core architectures that are readily expandable with minimal recalculation and reconfiguration efforts, and that are able to add the exact minimal number of additional spines and leafs that are needed.

SUMMARY

It can be an advantage of the present invention to provide improved information handling systems and methods that utilize more readily expandable distributed core architectures. Such improved systems and methods preferably result in expansions that can be made with minimal recalculation and reconfiguration efforts, such that the exact minimal number of additional spines and leafs that are needed are actually added. In particular, the various systems and methods provided herein can involve DCAs having spine switches and/or leaf switches that have unused ports which are reserved for future use. In such arrangements, the unused ports can be used in the future to attach additional spines and/or leafs as may become needed. Current configurations of a DCA can be designed so as to be accommodating of what is needed in the future, such that the current wire mapping need not be disturbed when new switches are added during expansion. Such future and accommodating current configurations can be calculated using a distributed core manager or other software tool, program or module.

In various embodiments of the present invention, a distributed core network system can include a plurality of spine switches, each having a plurality of spine ports and being adapted to facilitate the transmittal of network data, a plurality of leaf switches coupled to said plurality of spine switches, each having a plurality of leaf ports and being adapted to facilitate the transmittal of network data therethrough, and a plurality of interconnections coupling each of the spine switches via its spine ports to each of the leaf switches via its leaf ports. Each of the plurality of spine switches can include at least one unused spine port that is reserved for a future expansion of the distributed core network in order to accommodate the addition of at least one other separate leaf switch to the at least one unused spine port. Similarly, leaf switches can include at least one unused leaf port that is reserved for a future expansion of the distributed core network in order to accommodate the addition of at least one other separate spine switch to the at least one unused leaf port. More than one leaf and/or spine switch can be added during expansion in this manner.

In various embodiments, the plurality of interconnections is adapted to require no adjusting upon the addition of the at least one other separate leaf switch. This plurality of interconnections can include a plurality of cables, and the plurality of interconnections can utilize an OSPF interconnect protocol. In addition, said plurality of leaf switches can each further include a plurality of user ports adapted to couple with one or more downlinked system components. In various embodiments, the system can include this plurality of downlinked system components coupled to the plurality of user ports on the plurality of leaf switches. In addition, the distributed core network can be adapted to facilitate communications between each pairing of said plurality of downlinked system components that are coupled to different leaf switches by using one or more spine switches between the respective leaf switches. Also, the plurality of leaf switches can further include one or more user ports adapted to couple with one or more uplinked system components or network connections.

In various embodiments, the subject distributed core network system can further include a computing system that assists in the design of the specific number and configuration of spine switches, leaf switches, and interconnections based upon user inputs. Such user inputs can include the number of user ports that are currently needed and the number of user ports that will be needed in the future, among other possible parameters or needs.

In various further embodiments of the present invention, a computing system adapted to implement an expandable distributed core architecture can include a plurality of input and output devices adapted to accept user inputs and provide computed outputs regarding the expandable DCA, wherein the expandable DCA includes a plurality of spine switches, a plurality of leaf switches, and a plurality of interconnections coupling the spine switches to the leaf switches, a processor adapted to process the user inputs according to a provided set of instructions to arrive at the computed outputs regarding the expandable DCA, and one or more modules adapted to be executed with respect to said processor. The one or more modules can be software, and can contain computer code adapted to facilitate accepting inputs from a user regarding desired features for the expandable DCA, to generate an output DCA configuration using the user inputs, and to facilitate providing the output DCA configuration to the user.

As in the foregoing embodiments, the user inputs can include the number of user ports that are currently needed and the number of user ports that will be needed in the future. Further, the output DCA configuration can include at least one open port on each of the plurality of spine switches, whereby at least one new leaf switch can be added later to the expandable DCA. Also, the output DCA configuration can include a wire mapping for the plurality of interconnections that requires no adjusting upon the addition of one or more new leaf switches, one or more new spine switches, or both. The one or more modules can include a design module, a build module and a run module.

In still further embodiments, various methods of implementing an expandable distributed core architecture having reserved interconnect bandwidths can be provided. Such methods can include the process steps of accepting user input regarding parameters for an expandable DCA having a plurality of spine switches, a plurality of leaf switches having a plurality of user ports, and a plurality of interconnections coupling the leaf and spine switches, wherein the parameters include required features for a current DCA and required features for an expanded DCA, designing an expanded DCA configuration based on the required features for an expanded DCA, designing a current DCA configuration based on the expanded DCA configuration and the required features for a current DCA, wherein the current DCA configuration includes at least one open port on each of the plurality of spine switches to provide for expansion by at least one new leaf switch, and providing the current DCA configuration to the user.

Again, the user input can include the number of user ports that are currently needed and that will be needed in the future. Also, the step of designing a current DCA configuration can include generating a physical wire mapping that specifically couples the plurality of spine switches to the plurality of leaf switches via the interconnections. Further, the current DCA configuration can include at least one direct interconnection between every spine switch and every leaf switch.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive expandable distributed core architecture based data network devices, systems and methods. These drawings in no way limit any changes in form and detail that may be made to the invention by one skilled in the art without departing from the spirit and scope of the invention.

DETAILED DESCRIPTION

Figure 1A:
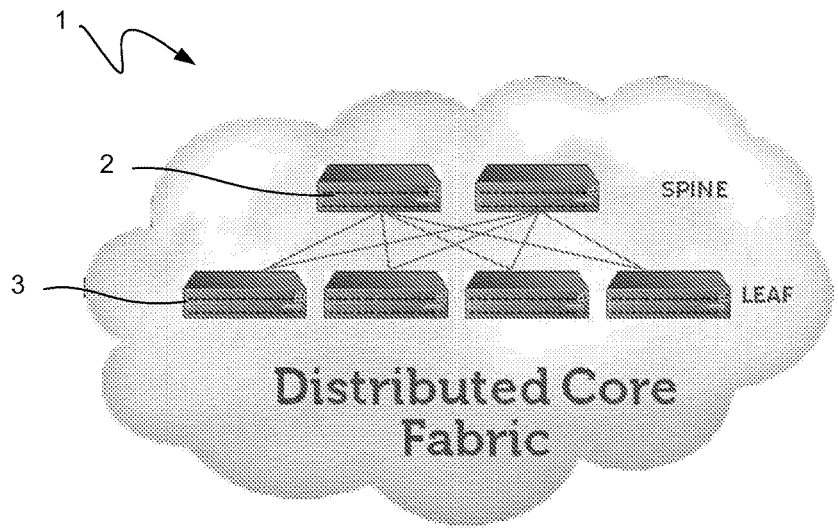
FIG. 1A illustrates in block diagram format the layout of an exemplary spine and leaf arrangement to form a distributed core fabric.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting. In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

For purposes of this disclosure, an information handling system may include an instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device, and may vary in size, shape, performance, functionality and price. The information handling system may include random access memory ("RAM"), one or more processing resources such as a central processing unit ("CPU") or hardware or software control logic, read only memory ("ROM"), and/or other types of nonvolatile memory. Additional components of the information handling system may include one or more disk drives, one or more network ports for communicating with external devices, as well as various input and output ("I/O") devices, such as a keyboard, a mouse, and a video display. The information handling system may also include one or more buses operable to transmit communications between the various hardware components.

The present invention relates in various embodiments to devices, systems and methods involving information handling systems. In particular embodiments, the subject information handling devices, systems or methods utilize distributed core architectures and features thereof. Such distributed core architectures can include the use of spines, leafs, interconnections therebetween, and external uplinks and downlinks, among other hardware components. In addition, various software and firmware components can be included with the subject distributed core architectures. A wide variety of software protocols, platforms and programs can be used, and it is specifically contemplated that any suitable protocol, platform or program can be used with the systems and methods set forth herein. Such a system can be known as a Data Fabric Network Management System, among other possibilities. As specific non-limiting examples, software components such as the Indigo, Distributed Core Manager/DCM, or Dell Fabric Orchestrator software infrastructures provided by Dell Force10 of San Jose, Calif. can be used, among other possibilities.

In various embodiments, one or more subject software infrastructures, programs or modules can provide for a specific reservation of interlink or fabric bandwidth. Such a reservation can be initially determined by requesting user inputs with respect to immediate and future needs for ports, bandwidths, oversubscription ratios and other possible factors. Various methods for determining fabric for a given set of user ports can range from reserving the maximum possible fabric required in a fully populated configuration to creating a topology that satisfies the requirements for a given oversubscription ratio and number of user ports that cannot be expanded further. Both a sizing tool and a configuration generator can take the appropriate input to allow for future expansion on a given distributed core architecture ("DCA"). These tools can also assist in growing the distributed core from an initial or current configuration to a larger or even maximum configuration for the provided inputs.

Distributed core architectures are typically specific purpose-built, high-performance networking fabrics capable of scaling up to 160+ Tbps or more. Often referred to as a "leaf-spine architecture," a DCA can employ two types of nodes—a leaf node switching component or "leaf" that connects servers or top-of-rack elements, and a spine node switching component or "spine" that connects switches. When configured properly, a 3-stage Clos network can be derived from the leaf-spine system, which can provide extremely low-latency and non-blocking performance between any two ports of the fabric.

There can be several significant advantages to a DCA arrangement. For one thing, costs can be significantly reduced by using multiple low-cost Ethernet switches as opposed to traditional and expensive chassis-based systems. There can be full bisectional bandwidth for communication across any port to any port, and any host can communicate with any other host in the network at the full bandwidth of its network interface. Further, the system can be resilient in that nodes can be restarted or replaced without losing the entire switching fabric.

Turning first to FIG. 1A, an exemplary spine and leaf arrangement forming a distributed core fabric is illustrated in block diagram format. System 1 includes a number of spines 2 that are each coupled to each of a number of leafs 3 in a distributed fashion through a plurality of interconnects. Each spine 2 and leaf 3 can be a system node within a distributed core fabric, with various servers, storage items and/or other additional system components (not shown) being coupled to each leaf. Each spine and leaf can also be any of a number of possible hardware items, such as, data center networking switches. As specific non-limiting examples, either of the S4810 or Z9000 networking switches provided by Dell Force10 of San Jose, Calif. can be used, although other switches or suitable components could also be used. A particular high end data center network switch, which can be, for example, the S4810 among other possibilities, can be a single rack unit system capable of supporting 48 1 GbE and 4 40 GbE ports or 64 10 GbE ports. It requires 350 watts of power and enables a number of non-blocking or over-subscribed distributed core designs. Another particular high end data center network switch, which can be, for example, the Z9000 among other possibilities, can be a two rack unit system capable of supporting 32 40 GbE ports or 128 10 GbE ports and requires 800 watts of power. The Z9000 can support up to 64 spine nodes and 128 leaf nodes to create a 160 Tbps core in an extremely small power and cost footprint. In various embodiments, every spine can be the same or a similar component, while every leaf can be the same or a similar component.

Figure 1B:
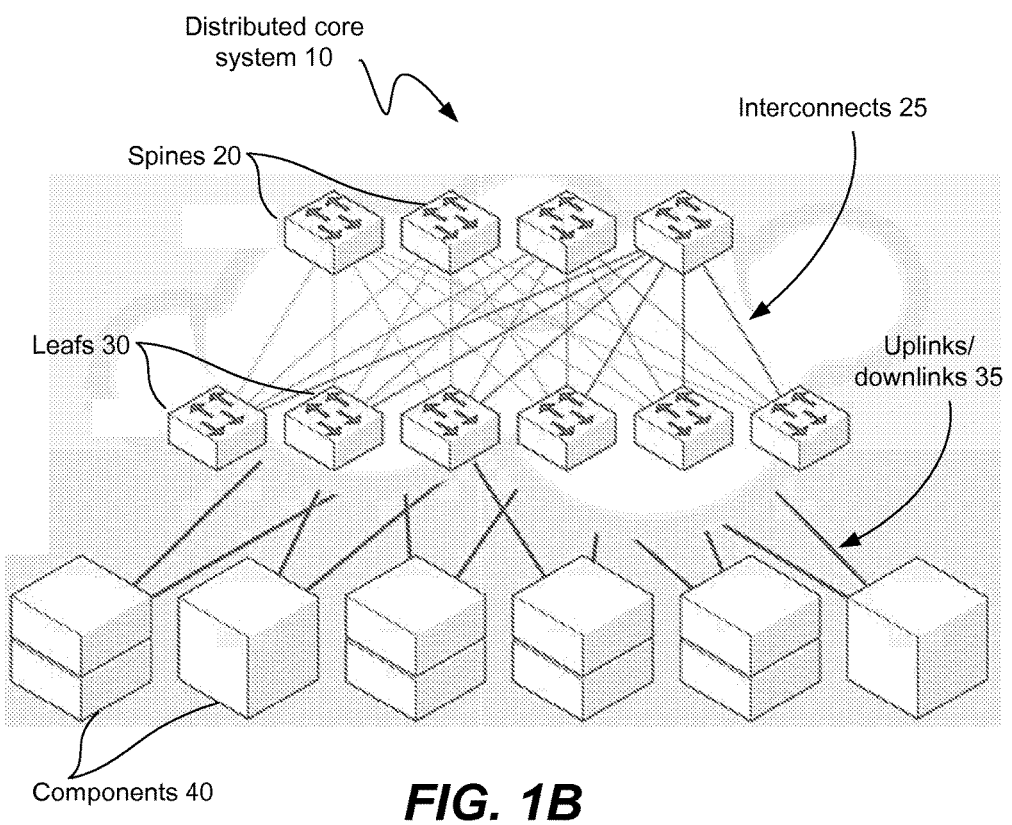
FIG. 1B illustrates in block diagram format the layout of a larger exemplary distributed core architecture having spines, leafs and servers.

Continuing with FIG. 1B, a larger exemplary distributed core architecture having spines, leafs and servers is similarly shown in block diagram format. Distributed core system 10 includes a number of spines 20 that are each coupled to each of a number of leafs 30 in a distributed fashion through a plurality of interconnects 25. Such interconnects 25 between spines 20 and leafs 30 can be arranged according to an Open Shortest Path First ("OSPF") protocol, for example. In some embodiments, every spine 20 connects to every leaf 30. In turn, every leaf 30 is coupled to various system components 40 through a plurality of uplinks and/or downlinks 35. Such uplinks and/or downlinks can be to one or more servers, storage items and/or other components, and can be made by way of one or more WANs, VLANs, LANs, other network connections and the like.

For a given distributed core system 10 having a plurality of servers, storage components and other network items that are to be interconnected, there can be an enormous number of configurations involving different switching components and routing possibilities for a switching fabric or network core situated therebetween. As will be readily appreciated, the vast majority of such configuration possibilities are less than optimal due to higher costs, lower throughputs, slower speeds, and so forth. Ideal or near ideal configurations will include a minimal amount of switches and routing components, as well as a specific arrangement of routing interconnects therebetween. Such configurations are often designed using a system software tool or program that can output a particular outcome or arrangement for a given set of system requirements, such as a desired number of uplinks, number of downlinks, bandwidth, oversubscription ratio, and/or other system parameters.

For example, where a user might desire a system having 250 downlinks, 4 uplinks, an oversubscription ratio of 1, and a specific model of light switch to serve as both the spines and leafs for the system, a system tool or program might accept user inputs to such effect and specify a good or optimal configuration having 2 spine switches, 4 leaf switches, and one or more particular direct link interconnects between each spine and leaf. The combined number of downlinks and uplinks can be spread across the total of 4 leaf switches. This specific configuration, however, is often not optimal with respect to being able to take the existing system and readily expand it to include additional ports, increased bandwidth and/or other system parameters in the event of increased needs or demands in the future for the overall system user. As such, the system tool or program is preferably adapted to account for future expansion of the system at the time an initial system configuration is determined. These future expansion parameters can also be input to the system tool or program in terms of the number of ports, bandwidth and other items that are thought to be needed in the future, such that the configuration output for the present is designed to be able to expand up to that which is specified for the future.

Figure 2:
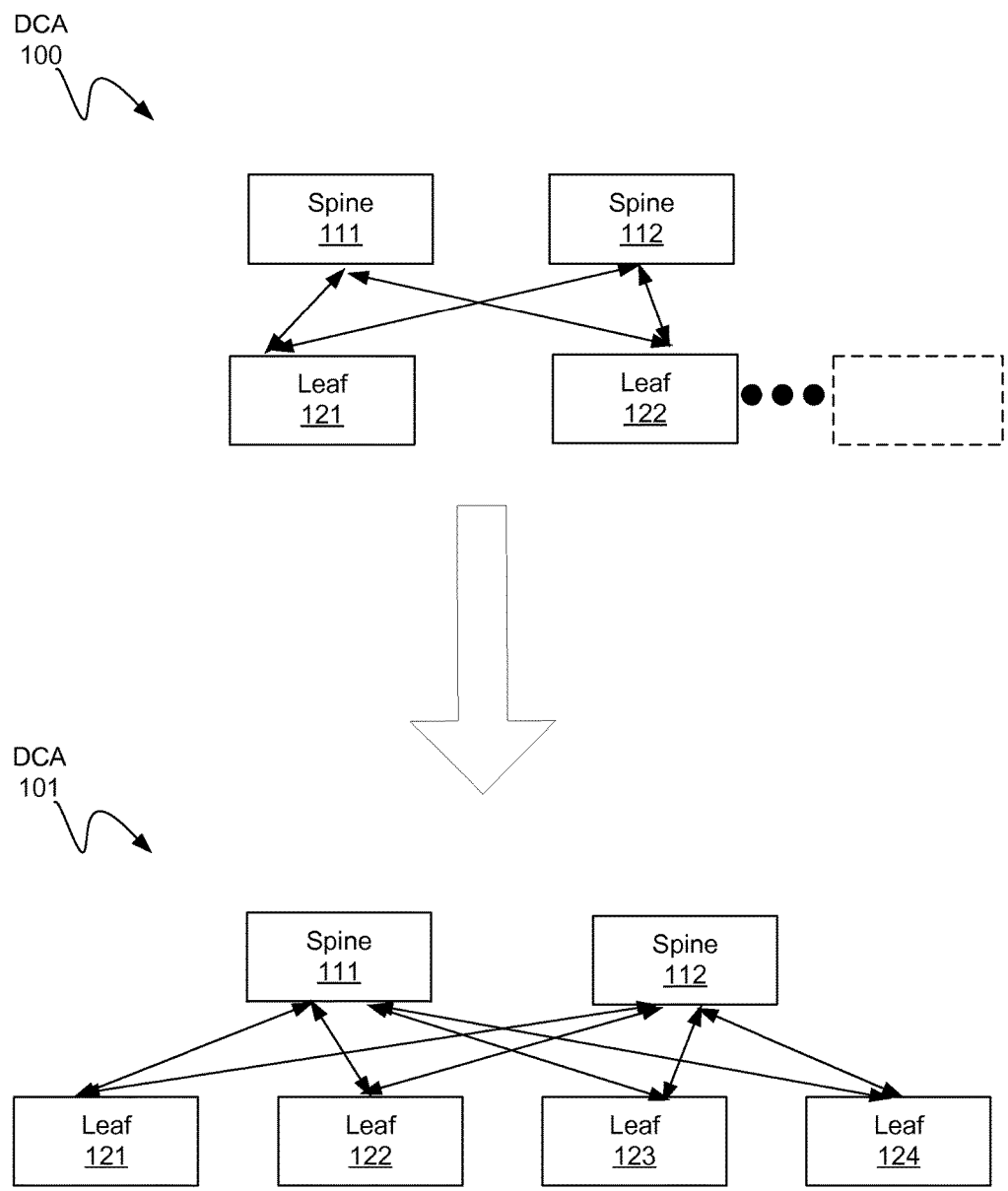
FIG. 2 illustrates in block diagram format the layout and development progression of an exemplary distributed core architecture adapted to expand in a streamlined fashion according to one embodiment of the present invention.

Moving next to FIG. 2, the layout and development progression of an exemplary distributed core architecture adapted to expand in a streamlined fashion is provided in block diagram format. DCA 100 includes two spine switches 111, 112 and two leaf switches 121, 122. This system architecture can be arranged so as to support in a preferable manner the number of ports, bandwidth, oversubscription ratio and other parameters that were specified by a user prior to forming the system. That is, there are preferably no more spines, leafs, other switches, connections or other system components present than are needed, with the overall system having suitable amounts of bandwidth and oversubscription, preferably in an OSPF arrangement. In addition, DCA 100 is further configured such that a number of ports, bandwidth and other system resources are reserved for future expansion, as indicated by the dotted line box next to leaf switch 122.

Upon expansion, DCA 100 can become DCA 101 at some later time. As one non-limiting example, a set of future expansion parameters specified by a user can result in DCA 100 being adapted to expand from two spines and two leafs to two spines and four leafs. Such expansion preferably involves no significant changes to any of spine switches 111, 112, any of existing leaf switches 121, 122, or any of the interconnects therebetween. Rather, such expansion can involve simply adding two new leaf switches 123, 124 and interconnecting these switches with both of existing spine switches 111, 112. Such interconnecting can preferably involve the use of existing unused ports on spines 111, 112 specifically reserved for expansion. Such reservations and wiring arrangements could be made by the system tool or program.

Figure 3:
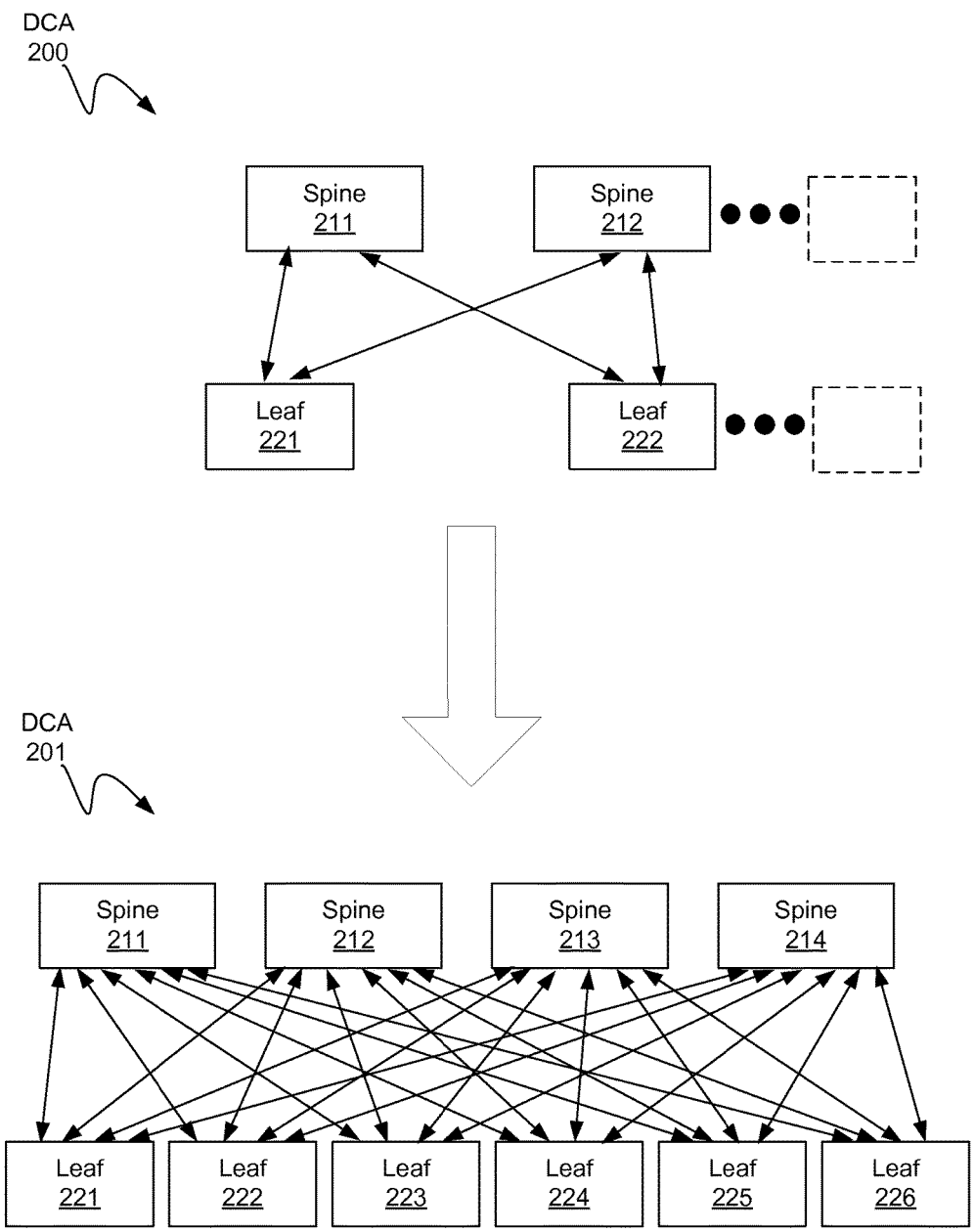
FIG. 3 illustrates in block diagram format the layout and development progression of an alternative exemplary distributed core architecture adapted to expand a greater amount in a streamlined fashion according to one embodiment of the present invention.

Continuing with FIG. 3, the layout and development progression of an alternative exemplary distributed core architecture adapted to expand a greater amount in a streamlined fashion is similarly shown in block diagram format. Similar to the foregoing embodiment of FIG. 2 above, original DCA 200 includes two spine switches 211, 212 and two leaf switches 221, 222. Again, this system architecture can be arranged so as to support in a preferable manner the number of ports, bandwidth, oversubscription ratio and other parameters that were specified by a user prior to forming the system. That is, there are preferably no more spines, leafs, other switches, connections or other system components present than are needed, with the overall system having suitable amounts of bandwidth and oversubscription, preferably in an OSPF arrangement. Also similar to the foregoing embodiment, DCA 200 is further configured such that a number of ports, bandwidth and other system resources are reserved for future expansion, as indicated by the dotted line boxes next to leaf switch spine switch 212 and leaf switch 222.

Unlike the foregoing embodiment, however, DCA 200 is configured for a larger expansion. That is, DCA 200 can become DCA 201 at some later time upon expansion. As another non-limiting example, a set of future expansion parameters specified by a user can result in DCA 200 being adapted to expand from its original two spines and two leafs to four spines and six leafs, which would then support a significant increase in available ports and bandwidth. Similar to the foregoing example, such expansion preferably involves no significant changes to any of existing spine switches 211, 212, any of existing leaf switches 221, 222, or any of the interconnects therebetween. Rather, such expansion can involve adding two new spine switches 213, 214, adding four new leaf switches 223, 224, 225, 226, and interconnecting these new switches with the existing spine switches 211, 212 and leaf switches 221, 222. Such interconnecting can preferably involve the use of existing unused ports on the existing switches that were specifically reserved for expansion. Again, such reservations and wiring arrangements could be made by the system tool or program upon the design and configuration of original DCA 200.

Figure 4:
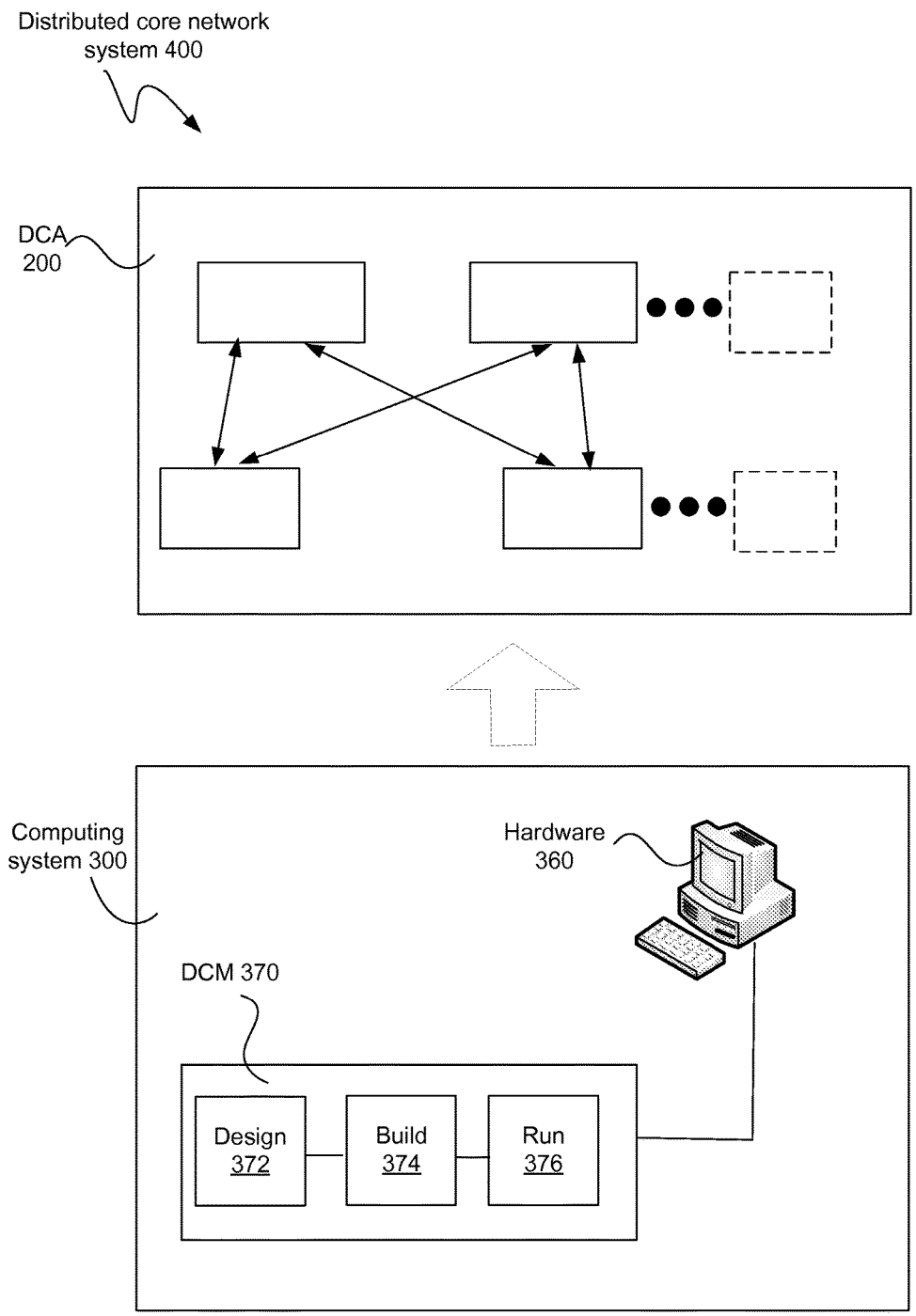
FIG. 4 illustrates in block diagram format an exemplary computing system having a software tool adapted to configure an expandable distributed core architecture according to one embodiment of the present invention.

Turning next to FIG. 4, an exemplary computing system having a software program or tool adapted to configure an expandable distributed core architecture is illustrated in block diagram format. An overall distributed core network system 400 can include a computing system 300 adapted to design one or more expandable DCAs, as well as at least one actual expandable DCA 200 itself. A given expandable DCA 200 can be customized, or can be a standardized solution to a relatively common set of input parameters, as may be applicable. In this particular example, the illustrated expandable DCA 200 can be that of the foregoing example in FIG. 3, although it will be readily appreciated that any other expandable DCA could be used.

A computing system adapted to design, build and run one or more expandable DCAs can include a hardware portion 360 as well as a software or program tool portion 370. The hardware portion 360 can include any suitable general or special purpose computer having one or more processors, storage components and peripherals, as will be readily appreciated. Peripherals can include input devices such as a keyboard, mouse, microphone, buttons, disk drive, data line, and/or other input items, as well as output devices such as a video monitor, speakers, disk drive, data line and/or other output components. The software portion 370 can include one or more proprietary programs or modules adapted to run on a variety of different computing platforms. Software portion 370 can include various features adapted to accept input from and provide output to a user, such as through the use of a graphical user interface ("GUI") on a video monitor or other similar hardware display.

Software portion 370 can include one or more programs that can be called any of a variety of things, such as, for example, a pre-sale calculation program, a configuration tool, or a Distributed Core Manager ("DCM"), among other possibilities. This DCM or tool 370 can include a number of modules or components, such as, for example, a Design module or sub-process 372, a Build module or sub-process 374, and a Run module or sub-process 376. Each of these different modules, components or sub-processes can have its own set of functions and parameters, and each one can potentially be provided separately, or all bundled together as a single tool or program offering.

Design module 372 can be a program or component that calculates the number of spine switches, number of leaf switches, and interconnected wire mapping that are needed based on various input data items, such as, for example, planned uplink ports, future uplink ports, planned downlink ports, future downlink ports, oversubscription ratio, downlink IP address/prefix and protocol profile, and/or downlink VLAN ID, among other possible user inputs or designations. After a calculation is computed, then this configuration tool or design module 372 can generate an outcome in a suitable format, such as, for example, a comma separated values ("CSV") file, Excel or other spreadsheet, or other appropriate usable output of computed result simulated data across the fabric. The CSV file or other output can contain information on the number and types of switches, number and types of ports, number and types of optics, number and types of cables, oversubscription ratio, and/or other pertinent data for a given DCA.

This calculation tool or design module 372 can indicate what is needed for an initial deployment of the given DCA that allows the current requirements to be met, as well as the required amount of spine and interlink ports that are reserved for future expansion. Again, in terms of such future expansion, the amount of spine and interlink ports that are reserved can depend upon the initial settings, as well as the called out maximum number of user and downlink ports that are specified for the future expansion. After a suitable configuration is computed given the planned and future ports, bandwidths and other input parameter variables, the design module 372 can preferably provide an initial number of spines and leafs, as well as a physical wire mapping that results in the performance that is initially needed while reserving ports and bandwidth for future expansion in a way that is readily and easily accomplished.

Build module 374 can be a program or component that utilizes a given output of the design module 372 to help build a respective DCA. Various functions or features of this build module 374 can include inputting or associating an input management IP address pool, loading the CSV file or other suitable output from the design module 372, generating an appropriate dynamic host configuration protocol ("DHCP") configuration file, generating a configuration file, transmitting the configuration into a receiving server, such as an FTP/sFTP or TFTP server, sending a request to discover a suitable node, and validating the plan and discovery configurations to report the result into the appropriate database. In the event that the input wiring matching does not match, then a new wiring mapping can be provided. Also, if the configuration with the noted protocol does not match, then the CSV or other suitable output file could also be provided. This could include, for example, one or more error messages regarding wiring information between one or more spines and one or more leafs.

Run module 376 can be a program or component that then runs with the built configuration after it is actually put online. This run module can be adapted to monitor the performance of the configured and built DCA, and can provide one or more statistics or vitals with respect to how the DCA is performing. As such, one or more adjustments or other troubleshooting implementations can be more readily accomplished where necessary. Any suitable interface statistics could be used to debug the connectivity flow between one or more spines and one or more leafs. For example, the connectivity between a spine and a leaf can be debugged using statistics of the respective related interfaces therebetween.

Overall, DCM 370 can provide a detailed wiring plan both in tabular and graphical format based on the design output, the content of which can be exported to a suitable output file (e.g., CSV file) from the GUI. Separate wiring plans can be provided both for the initial or current need, as well as for a future expanded need. A detailed generated network topology can provide a view of the distributed core based on the design output. A summary output can also be provided, which indicates all of the input parameters as well as the recommended number of nodes, types, optics and cables to be procured for initial deployment based on the current needs. Future expansion needs can be dealt with at a later time, as may be desired.

As one particular non-limiting example, a user may designate a system having 250 downlinks, 4 uplinks, an oversubscription ratio of 1, and a specific model of light switch to serve as both the spines and leafs for the system. The user may then also indicate that another 200 downlinks will be needed in the future, with the same number of 4 uplinks and an oversubscription ratio of 1. The system tool or program DCM 370 might accept these user inputs to such effect and specify a good or optimal configuration having 2 spine switches, 4 leaf switches, and one or more particular direct link interconnects between each spine and leaf, with the combined number of downlinks and uplinks being suitably spread across the total of 4 leaf switches. In addition, the DCM 370 could indicate that a total of 4 spine switches and 8 leaf switches would be needed when the system is expanded to have 450 downlinks.

In order to facilitate a streamlined expansion from 2/4 to 4/8 spines/leafs, a plurality of ports on each spine switch and leaf switch are deliberately left open in the initial configuration and wire mapping, with such open ports then being used when the new spines and leafs are added. In various embodiments, such an addition of more spines and leafs at a later expansion would then not involve any rewiring of the existing wire mapping for the original deployment. Rather, new spines, new leafs, and new interconnect wires are added according to an expansion configuration that uses the same wiring on the original deployment and just adds new wiring to account for the newly added system components. Such initial and later expansion wire mappings can be calculated to achieve this end using the DCM 370.

Exemplary screenshots from the software tool of FIG. 4 are shown according to one embodiment of the present invention can be described as follows. One screenshot depicts a sample display page during a design process run by the design module 372 above. Again, such a "Design Wizard" or other suitable software module or component can be adapted to accept user inputs and desired system parameters in order to design a DCA that is customized to the specific needs of the user. This can involve reviewing the proposed design after all inputs are considered.

Another screenshot may depict a sample display page during an initial part of a build process run by build module 374 above. In such a screenshot, the network topology has already been determined for a specific DCA, with the number of spines, number of leafs and graphical wiring plan all being known. The topology provided in the GUI of which the screenshot being described is a part indicates wiring specifications and notes for each port of each switch, such that a user can make the designed wiring connections while building the specifically designed DCA. While we have described just a couple of exemplary screenshots, it will be readily appreciated that other types of GUI presentations are also possible, and that similar presentations can be made to assist users at all stages and sub-processes within the DCM 370 and its various functions and features. It is specifically contemplated that all such suitable presentations and GUIs can be used with the systems and methods disclosed herein.

Figure 5:
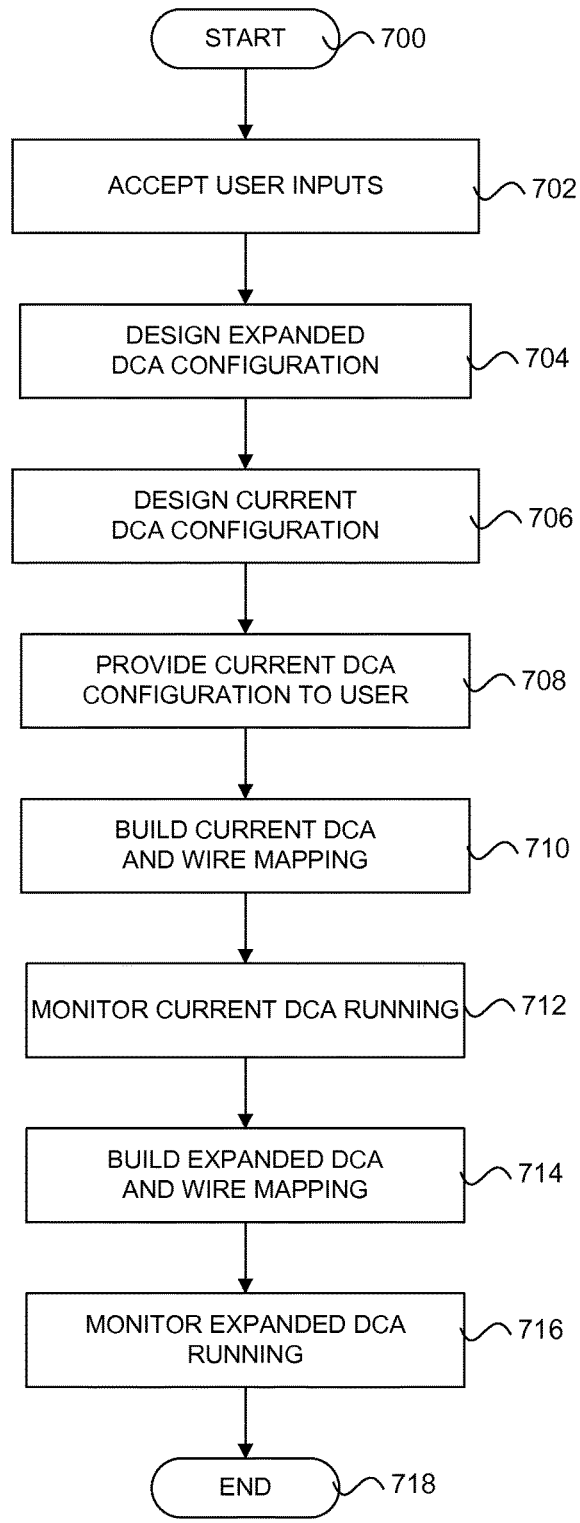
FIG. 5 provides a flowchart of an exemplary method of implementing a customized expandable distributed core architecture having reserved interconnect bandwidths according to one embodiment of the present invention.

Although a wide variety of applications involving expanding a distributed core architecture using the foregoing systems can be envisioned, one basic method is provided here as an example. Turning lastly to FIG. 5, a flowchart of an exemplary method of implementing a customized expandable distributed core architecture having reserved interconnect bandwidths is provided. In particular, such a method can involve using or operating a DCA manager or other computing system, such as any of the various DCM modules, tools, programs, and associated devices and systems described above. It will be readily appreciated that not every method step set forth in this flowchart is always necessary, and that further steps not set forth herein may also be included. Furthermore, the exact order of steps may be altered as desired for various applications. For example, some embodiments might involve designing some form of a current DCA configuration prior to designing an expanded DCA configuration, such that steps 704 and 706 are reversed. Alternatively, these steps can be performed in parallel. Also, further intermediate steps can involve the design of an intermediate expansion configuration between the current and finally fully expanded configurations, as will be readily appreciated.

Beginning with a start step 700, user inputs regarding current and future system needs are accepted into the system at process step 702. An expanded DCA configuration is then designed, calculated or otherwise found at process step 704, after which a current DCA configuration is designed at process step 706. The current DCA configuration can then be provided to the user at process step 708, after which the current DCA, including the specific wire mapping for the interconnections, can be built at process step 710.

At subsequent process step 712, the current DCA system can be monitored while it is running. This can occur for as long as the current DCA is adequate for the needs of the user. At some later time, the expanded DCA and its specific wire mapping can be built and its configuration validated at process step 714. This expanded DCA can also be monitored while it runs, with statistics and other system notes being provided as may be desired and suitable at process step 716. The method then proceeds to finish at end step 718. Further steps not depicted can include, for example, intermediate expansion designs, builds and monitoring.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A non-transitory computer storage storing a software portion of a computing system comprising one or more processors, the software portion being for causing the one or more processors executing the software portion to perform a method of implementing an expandable distributed core architecture ("DCA"), the method comprising:
    obtaining, by the computing system, requirements for DCA operation, the requirements comprising first requirements for the expandable DCA and second requirements for an expanded DCA, the first requirements comprising information on a number of user ports for the expandable DCA, the second requirements comprising information on a number of user ports for the expanded DCA, wherein the number of user ports for the expanded DCA is higher than the number of user ports for the expandable DCA;
    determining, by the computing system, a configuration of the expandable DCA based on the first and second requirements and on an optimality objective, wherein determining the configuration comprises using the information on the number of the user ports for the expandable DCA and the information on the number of the user ports for the expanded DCA to determine a number of spine switches for the expandable DCA, a number of leaf switches for the expandable DCA, and direct interconnections between the spine and leaf switches for the expandable DCA;
    wherein the configuration is for the expandable DCA corresponding to the first requirements but not the second requirements, but the configuration takes into account the second requirements to provide expandability of the expandable DCA to the expanded DCA with the expanded DCA including all of the spine and leaf switches of the expandable DCA and all of the direct interconnections between the spine and leaf switches of the expandable DCA, the configuration requiring at least one of the spine and leaf switches of the expandable DCA to have at least one spine or leaf port unused in the expandable DCA but used for interconnection between a spine switch and a leaf switch in the expanded DCA;
    wherein the optimality objective comprises at least one of:
    low cost;
    high throughput;
    high speed;
    minimal amount of switches;
    minimal amount of routing components.

2. The non-transitory computer storage of claim 1 wherein the information on the number of the user ports for the expandable DCA specifies the number of uplink ports for the expandable DCA and the number of downlink ports for the expandable DCA.

3. The non-transitory computer storage of claim 1 wherein the information on the number of the user ports for the expanded DCA specifies the number of uplink ports for the expanded DCA and the number of downlink ports for the expanded DCA.

4. The non-transitory computer storage of claim 1 wherein:
the information on the number of the user ports for the expandable DCA specifies the number of uplink ports for the expandable DCA;
the information on the number of the user ports for the expanded DCA specifies the number of uplink ports for the expanded DCA; and
the number of uplink ports for the expanded DCA is higher than the number of uplink ports for the expandable DCA.

5. The non-transitory computer storage of claim 1 wherein:
the information on the number of the user ports for the expandable DCA specifies the number of downlink ports for the expandable DCA;
the information on the number of the user ports for the expanded DCA specifies the number of downlink ports for the expanded DCA; and
the number of downlink ports for the expanded DCA is higher than the number of downlink ports for the expandable DCA.

6. The non-transitory computer storage of claim 5 wherein:
the information on the number of the user ports for the expandable DCA specifies the number of uplink ports for the expandable DCA;
the information on the number of the user ports for the expanded DCA specifies the number of uplink ports for the expanded DCA; and
the number of uplink ports for the expanded DCA is higher than the number of uplink ports for the expandable DCA.

7. The non-transitory computer storage of claim 1 wherein the expandable DCA configuration includes at least one direct interconnection between every spine switch and every leaf switch.

8. The non-transitory computer storage of claim 1 wherein each of the expandable and expanded DCAs includes at least one direct interconnection between every spine switch and every leaf switch.

9. The non-transitory computer storage of claim 1 wherein each spine and leaf switch of the expandable DCA has a spine or leaf port unused in the expandable DCA but used for interconnection between a spine switch and a leaf switch in the expanded DCA.

10. The non-transitory computer storage of claim 1 wherein determining said configuration comprises determining a configuration that reduces a cost of each of the expandable and expanded DCAs.

11. The non-transitory computer storage of claim 1 wherein determining said configuration comprises determining a configuration that increases throughput of each of the expandable and expanded DCAs.

12. The non-transitory computer storage of claim 1 wherein determining said configuration comprises determining a configuration that increases speed of each of the expandable and expanded DCAs.

13. The non-transitory computer storage of claim 1 wherein determining said configuration comprises determining a configuration that reduces a number of the spine and leaf switches in each of the expandable and expanded DCAs.

14. The non-transitory computer storage of claim 1 wherein each of the first and second requirements comprises a bandwidth requirement.

15. The non-transitory computer storage of claim 14 wherein the bandwidth requirement is higher for the expanded DCA than for the expandable DCA.

16. The non-transitory computer storage of claim 1 wherein each of the first and second requirements comprises oversubscription ratio.

17. The non-transitory computer storage of claim 1 wherein each of the first and second requirements specifies a switch model to serve as the spine and leaf switches.

18. The non-transitory computer storage of claim 1 wherein the expanded DCA has more of the leaf switches than the expandable DCA but the same number of the spine switches as in the expandable DCA.

19. The non-transitory computer storage of claim 1 wherein the expanded DCA has more of the leaf switches and more of the spine switches than the expandable DCA.

20. The non-transitory computer storage of claim 1 in combination with the one or more processors.

* * * * *